United States Patent [19]

Strömmen et al.

[11] Patent Number: 4,916,797
[45] Date of Patent: Apr. 17, 1990

[54] HYDRAULIC RETRIEVER AND METHOD FOR CHANGING PROBES ARRANGED IN PIPES OR VESSELS UNDER PRESSURE

[76] Inventors: Roe D. Strömmen, Braennesv. 24, 7022 Trondheim; Jarle Mjöen, Övertröa 2, 7080 Heimdal; Kjetil Wang, Wesselsgt. 19, 7043 Trondheim, all of Norway

[21] Appl. No.: 214,684

[22] Filed: Jul. 1, 1988

[51] Int. Cl.[4] .............................................. B23P 19/04
[52] U.S. Cl. ..................................... 29/426.5; 29/252
[58] Field of Search ...................... 29/252, 426.5, 251, 29/156.7, 157.1 R

[56] References Cited

U.S. PATENT DOCUMENTS 4,026,001  5/1977  Jones ...................................... 29/252

Primary Examiner—Robert C. Watson
Attorney, Agent, or Firm—James E. Pittenger

[57] ABSTRACT

A device for inserting or removing a plug and probe (13) which is subjected to high pressure in a process pipe or a tank. A nipple (12) is attached to the pipe (11) or the tank. The nipple can be secured by a cover (14). After removing the cover a ball valve (15) can be attached to the nipple. A hydraulic cylinder (16) is then externally connected to the ball valve. A piston in the cylinder can be connected to the probe through the ball valve. This piston can be used to pull the plug out or push it in through the ball valve. Once the plug has passed through the ball valve, the plug can be removed from the cylinder and replaced, if necessary.

10 Claims, 1 Drawing Sheet

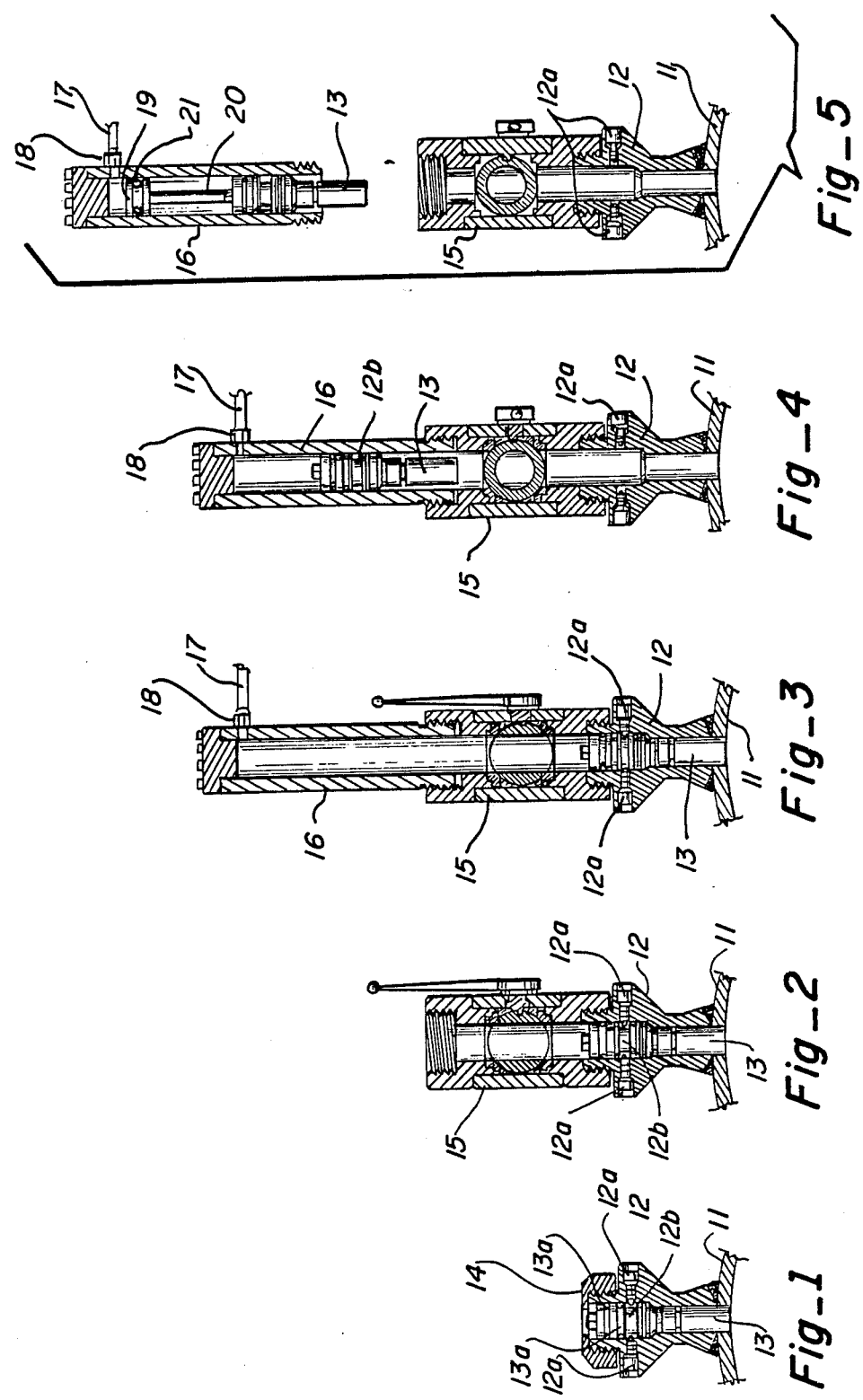

HYDRAULIC RETRIEVER AND METHOD FOR CHANGING PROBES ARRANGED IN PIPES OR VESSELS UNDER PRESSURE

FIELD OF THE INVENTION

The invention applies to a tool for changing probes or sensors which are installed in process pipes, tanks, etc., while thy are under pressure. More specifically, the invention refers to the design, mode of operation and functional principle of a tool which facilitates probe replacement without depressurizing the tank or pipe in which the probe is mounted.

BACKGROUND OF THE INVENTION

Probes have become widely used in the oil, gas and process industries to measure and monitor phenomena such as internal corrosion in the system. Examples of this are the ER or LPR probes or weight-loss couplons which are screwed into process pipes, well-heads, or water injection systems etc. By using a short threaded nipple (access fitting) with an internal thread and a sealing system, a probe can be screwed into a pipe so that it is in direct contact with the process medium.

The different types of probes and weight-loss coupons must be changed frequently. This is because of the variation and short lifetime of the probes and the planned inspection of the weight-loss coupons.

For many years, such replacement operations have been done by the help of mechanical tools or retriever equipment. The prior art operation consists of a ball valve which is screwed directly onto the access nipples in which the probe is mounted. An internal, axially moveable and rotatable bar is screwed onto a mechanical retriever, which consists of a double cylinder. The retriever is then mounted on the ball valve. The bar engages the threaded plugs and or probes to be screwed in or out of the nipple. The probe can be moved from the double, sealed cylinder through the open ball valve into the nipple in the alternative the probe can be moved from the nipple into the sealed cylinder. Once the probe has been moved through the ball valve into the retriever cylinder, the valve can be closed. The retriever cylinder can then be removed from the valve and the probe removed from the cylinder. It is then possible to attach a new probe onto the guide bar in the retriever cylinder, screw the retriever with the probe onto the valve, then open the ball valve, and guide the probe into position on the nipple again as it passes through the ball valve. Once the probe is completely screwed in the retriever and ball valve can be unscrewed. A considerable disadvantage with this traditional prior art mechanical system is the extreme length of the cylinder with the bar, typically 1.8-2.0 meters. This imposes considerable restrictions on use of the system. The jack of space means that it is difficult to service nipples which are close to other pipes, near the wall/floor or roof etc. The moveable cylinder unit with its bar also represents a danger in that sudden, axial movements of the bar caused by a lack of pressure-compensation in the retriever could injure the operator. A further difficulty is the considerable weight of such units. This means that the transport of the unit around a plant and its operation are both strenuous tasks.

SUMMARY OF THE INVENTION

The present invention refers to a new type of retriever which is based on a hydraulic operating principle the probe is mounted into a self-sealing plug. Unlike the traditional retriever this requires no internal bar with a mechanical link to the outside to rotate or mechanically screw a plug in which the probe is mounted in or out of the nipple. Instead the plug is attached to the nipple so that rotation is unnecessary. The plug with the probe is designed with circumferential sealing rings so that the hydraulic pressure difference within the retriever is sufficient to push the probe with the plug in and out of the nipple and the retriever.

BRIEF DESCRIPTION OF THE DRAWINGS

FIG. 1 is a partial cross-sectional view showing a plug and probe according to the present invention installed in a nipple mounted in the wall of a pressurized pipe;

FIG. 2 is a partial cross-sectional view showing a ball valve attached to the nipple of FIG. 1;

FIG. 3 is a partial cross-sectional view showing the retriever mounted on the ball valve of FIG. 2;

FIG. 4 is a partial cross-sectional view showing the plug with the probe hydraulically pushed into the retriever through the open valve; and FIG. 5 is a partial cross-sectional view showing the retriever and plug removed from the closed valve.

DETAILED DESCRIPTION OF THE INVENTION

FIG. 1. This shows a cross section of a cylindrical plug 13 with a probe mounted therein. The plug 13 is installed with sealing rings 13a on the nipple which is welded to the wall of the pipe. Both the cylindrical hole in the nipple and the probe with the plug are tapered so that the outermost part has a larger diameter than the innermost part. Upon slidable insertion, the plug 13 will be firmly placed against the conical tapering, which functions here as a sealing surface. Four locking pins 12a such as pin or screws are spaced at 90° from each other around the circumference of the nipple, as shown in FIG. 1 the pins 12a are screwed or inserted into a groove around the circumference of the plug 13 to hold the plug 13 and probe in position.

An external cover 13 can also be screwed on, onto the nipple 12, the cover 14 will both keep the plug 13 in position and reduce the strain on the locking pins 12a during normal operations.

Removal of the probe/plug

FIG. 2. When changing a probe, the operation entails first removing the cover 14, then screwing a ball 15 valve on the external threads of the nipple 12.

FIG. 3. A cylindrical retriever 16 with the outer end sealed screwed onto the closed ball valve 15, as is shown in FIG. 3. A hose 17 from a hand pump is connected to the upper end of the cylinder by means of a quick disconnect coupling 18.

The cylinder is then filled with oil or other fluid present in the pipe (valve 15 in open position) and pumped until the pressure is the same as in the process pipe.

The locking pins 12a are then loosened slightly so that they are freed from the groove 12b around the plug 13, enabling the plug 13 to be free and moveable.

FIG. 4. Once the locking pins 12a have been loosened, the pressure is reduced in the retriever cylinder 16 by slowing opeing a valve in the attached hand pump. The pressure difference between the process pipe and the plug with the retriver cylinder will be sufficient to eject the plug with the probe back through the valve and into the retriever cylinder. The oil in the cylinder is slowly released back into the oil reservoir in the hand pump to control and permit this movement.

FIG. 5. Once the plug 13 has passed the ball valve, it will be possible to close the valve 15. When this valve is closed, the retriever cylinder containing the probe and plug 13 is unscrewed and the plug and probe can either be replaced or inspected before it is reinserted.

Insertion of the probe/plug

The probe and plug 13 is inserted by reversing the above removal procedure:

The cylinder 16 with the plug is screwed onto the ball valve 15. The cylinder chamber in front of the plug 13 is filled with oil either by using a by-pass line from the hand pump or by opening the ball valve.

The plug and probe is then pushed into position by pumping oil into the space behind the plug by use of the hand pump. Once the plug is in position in the nipple 12, the locking pins 12a are moved into place to hold the plug 13 and probe in position.

The cylinder 16 and ball vavle 15 are removed and the cover 14 is screwed back on to the nipple 12 to provide extra safety and ease the strain on the locking pins 12a.

Given unfavorable operating conditions of different kinds, the removal and insertion of the plug may present a probelm if the sealing rings 13a have become permanently attached over a long period time. Here an alternative design of the tool is the answer to such a problem. This arrangement includes a piston 19 which operates inside the retriever cylinder 16 for tapping, pushing or pulling plug 13. When the operaion is started, the piston 19 is linked to the probe plug by an intermediate bar 20. This means that the retriever piston 19 only moves inside the cylinder 16 and the piston sealing o-rings 21 do not pass through the ball valve. This reduces the danger of damaging the o-rings 21 on the piston. On the other hand, the cylinder has to be somewhat longer than in the example referred to above to accommodate the piston. The operation of this embodiment is similar in all other respects.

We claim:

1. A retriever tool for the insertion and removal of a sensing probe from the wall of a pressurized vessel, said probe being mounted in a threaded nipple attached to the wall of the pressurized vessel, the tool comprising:
   (a) a nipple means which is arranged to be permanently attached to a corresponding aperture in a pressure vessel or pipe, said nipple means having a smooth tapered inner bore and an outer end when attached to said vessel, the inside diameter of said bore being greater at the outer end of said nipple means;
   (b) a plug means sized to slidably fit into the inner bore of said nipple means said plug means having a sealing means for sealing with said nipple means to prevent leakage from said pressure vessel, said plug means being adapted to removably receive and mount a sensing probe therein, whereby said probe will be in communication with the fluid within said vessel, said nipple means and plug means including a releasable means for retaining the plug and probe within said nipple means;
   (c) valve means having means for sealingly attaching the valve means to the nipple means, said valve means having a straight through internal passageway permitting passage of the plug means and probe when the valve is in the open position and sealing said nipple means when in the closed position; and
   (d) a retriever means having a hollow tubular cylinder which is large enough to receive said plug means, said cylinder having a closed end and an opposite open end, said open end being connected to said valve means, the closed end of said cylinder being connected to a means for controllably pressurizing said cylinder with fluid whereby when the valve means and retriever means are mounted on said nipple means, the retriever cylinder means can be pressurized to the same pressure as the vessel and the plug means and probe can be removed when the retainer means is released and the cylinder pressure is slowly reduced.

2. A retriever tool as defined in claim 1 wherein the nipple means includes a cover means which attaches to the outer end of the nipple means to seal the nipple means and secure the plug means when the valve means is not attached.

3. A retriever tool as defined in claim 1 wherein said controllable pressurizing eans is a hand pump having a fluid reservoir and a control valve whereby the fluid pressure in said cylinder can be easily controlled for removal and insertion of the plug means and probe.

4. A retriever tool as defined in claim 1 wherein the sealing means for said plug means includes one or more circumferential sealing rings properly sized to seal against the inner bore of said nozzle means.

5. A retreiver tool as defined in claim 1 wherein the retainer means for said plug means includes one or more radially moveable pins equally spaced around said nipple means and a circumferential groove formed in said plug means, said groove being sized and positioned on said plug means to receive said pins so that the plug means can be releasably mounted and retained within said nipple means.

6. A retainer tool as defined in claim 1 wherein said nipple means contains threaded bores and said retaining pins are threaded whereby the pins can be screwed through the nipple means to retain the plug means in said nipple means.

7. A retriever tool as defined in claim 1 wherein said retriever cylinder means further includes an internal piston and a connector bar attached thereto, said bar being arranged to extend toward the open end of the cylinder whereby the piston can be moved toward the plug means so that the bar can contact the plug means for aiding and removing or inserting the plug means and probe.

8. A retriever tool as defined in claim 1 wherein said valve means is a ball valve having a constant diameter passageway extending therethrough when the valve is in the open position.

9. A process for removing a probe from a pressurized vessel, the steps comprising:
   (a) permanently mounting a nipple on an appropriately sized aperture in the wall of a pressure vessel, said nipple being arranged to receive a slidable sealing plug, said plug being arranged to mount a sensing probe for contacting and sensing the fluid within said vessel;
   (b) inserting a plug and probe within said nipple and releasably retaining said plug in said nipple;
   (c) attaching a ball valve into said nipple;

(d) attaching an end of a tubular retriever cylinder to said ball valve and closing the opposite end of said cylinder;

(e) opening said ball valve and pressurizing the retriever cylinder with fluid from an external source to form a pressure within the cylinder equal to the pressure within said vessel;

(f) releasing the retainer holding said plug and probe within the nipple and slowly reducing the pressure within the cylinder so that the fluid pressure within said vessel will push the plug and probe from the nipple, through the vavle and into the cylinder; and (g) closing said ball valve to seal the nipple and allow removal of the cylinder and access to said plug and probe.

10. The process as described in claim 9, wherein a piston having an extended bar is inserted within said cylinder and the cylinder is pressurized with fluid to move said bar through the ball valve to push or tap the plug to loosen the plug when it becomes lodged in said nipple.

* * * * *